United States Patent
Yuan et al.

(10) Patent No.: US 10,281,760 B2
(45) Date of Patent: May 7, 2019

(54) COLOR FILTER SUBSTRATE AND DISPLAY DEVICE

(71) Applicants: Shanghai Tianma Micro-Electronics Co., Ltd., Shanghai (CN); Tianma Micro-Electronics Co., Ltd., Shenzhen (CN)

(72) Inventors: Yong Yuan, Shanghai (CN); Chao Wang, Shanghai (CN)

(73) Assignees: SHANGHAI TIANMA MICRO-ELECTRONICS CO., LTD, Pudong New District, Shanghai (CN); TIANMA MICRO-ELECTRONICS CO., LTD., Futian District, Shenzhen (CN)

( * ) Notice: Subject to any disclaimer, the term of this patent is extended or adjusted under 35 U.S.C. 154(b) by 741 days.

(21) Appl. No.: 14/965,860

(22) Filed: Dec. 10, 2015

(65) Prior Publication Data

US 2016/0178940 A1    Jun. 23, 2016

(30) Foreign Application Priority Data

Dec. 23, 2014 (CN) .......................... 2014 1 0831606

(51) Int. Cl.
*G02F 1/1335* (2006.01)

(52) U.S. Cl.
CPC .. *G02F 1/133512* (2013.01); *G02F 1/133514* (2013.01); *G02F 2201/52* (2013.01); *G02F 2201/56* (2013.01)

(58) Field of Classification Search
CPC ......... G02F 1/133512; G02F 1/133514; G02F 1/1362

USPC .......................................................... 359/893
See application file for complete search history.

(56) References Cited

U.S. PATENT DOCUMENTS

| 8,345,209 | B2 | 1/2013 | Fujita | |
| 2006/0012733 | A1* | 1/2006 | Jin | G02F 1/13336 349/73 |
| 2006/0267892 | A1* | 11/2006 | Pei | G09G 3/3685 345/88 |
| 2009/0309813 | A1 | 12/2009 | Fujita | |
| 2010/0020277 | A1 | 1/2010 | Morita | |

(Continued)

FOREIGN PATENT DOCUMENTS

| CN | 101782697 A | 7/2010 |
| JP | 2008216357 A | 9/2008 |

*Primary Examiner* — Kristina M Deherrera
(74) *Attorney, Agent, or Firm* — Faegre Baker Daniels LLP (57) ABSTRACT

A color filter substrate and a display device are disclosed. The color filter substrate includes a non-rectangular display region, which includes a peripheral display region including a black matrix and a plurality of first, second and third sub-pixels, and a non-display region. A sum of the ratios of the light-transmitting area respectively corresponding to the plurality of the first sub-pixels to areas of the same, a sum of the ratios of the light-transmitting area respectively corresponding to the plurality of the second sub-pixels to areas of the same, and a sum of the ratios of the light-transmitting area respectively corresponding to the plurality of the third sub-pixels to areas of the same are represented as P1, P2 and P3, the difference between the maximum and minimum values among P1, P2 and P3 is less than 0.3 times an average value of P1, P2 and P3.

14 Claims, 8 Drawing Sheets

(56) References Cited

U.S. PATENT DOCUMENTS

2010/0289994 A1   11/2010   Nonaka
2012/0287382 A1*  11/2012   Qi ..................... G02F 1/133512
                                                349/106

* cited by examiner

Related Art

Figure 1A

Related Art

COLOR FILTER SUBSTRATE AND DISPLAY DEVICE

CROSS-REFERENCE TO RELATED APPLICATION

This application claims priority to Chinese Application No. 201410831606.X, filed Dec. 23, 2014, which is herein incorporated by reference in its entirety.

TECHNICAL FIELD

The present disclosure relates to the field of display technologies and, in particular, to a color filter substrate and a display device.

BACKGROUND

With the rapid development of intelligent terminals such as smart bracelets and smart watches, shapes of display devices in the intelligent terminals are increasingly diversified, and some display devices having curved boundaries are already quite common.

Figure 1A:
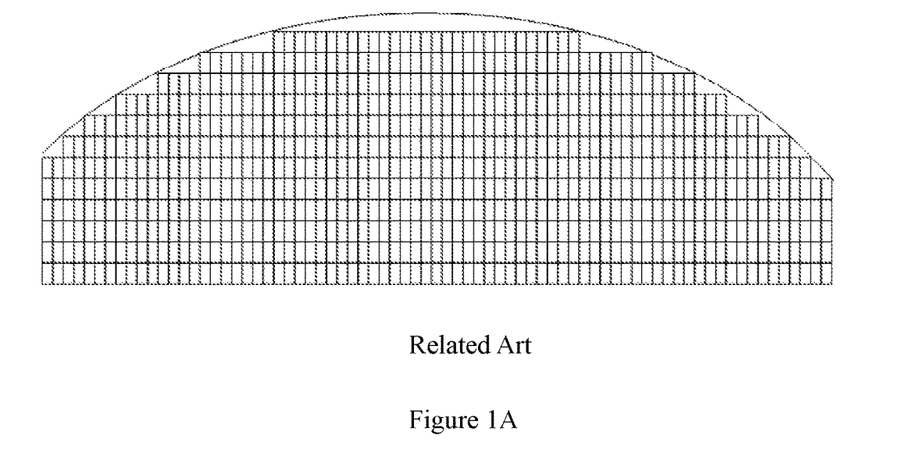
FIG. 1A is a schematic diagram showing a structure of a color filter substrate of an existing display device.
Figure 1B:
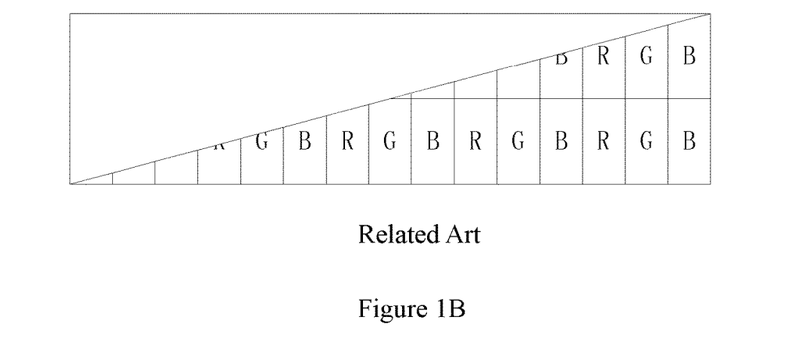
FIG. 1B is a schematic diagram showing a structure of a color filter substrate of an existing display device.

FIGS. 1A and 1B are schematic diagrams showing a structure of a color filter substrate of an existing display device. It can be seen from FIG. 1A and FIG. 1B that, if the color filter substrate is provided with a curved boundary, a peripheral display region adjacent to the curved boundary is too small to arrange complete pixels. In this case, in absence of sub-pixels in the peripheral display region, steps exist in an edge region of the color filter substrate, causing the discontinuity of displayed information, so that an image displayed by a display device containing such color filter substrate has jagged edges. Further, if sub-pixels are arranged in the peripheral display region and are partially covered, color cast is caused in the peripheral display region because the sub-pixels are covered in different ratios, for example, when red sub-pixels are covered with the maximum ratio and blue sub-pixels are covered with the minimum ratio, chromaticity of the combined sub-pixels tends to ultramarine.

As such, a phenomenon of jaggies or color cast exists in the peripheral display region of an existing color filter substrate, thus affecting visual effects of the display device.

SUMMARY

In view of the above, embodiments of the disclosure provide a color filter substrate and a display device as so to improve quality of the color filter substrate and enhance visual effects of the display device.

In a first example, embodiments of the disclosure provide a color filter substrate, which comprises a non-rectangular display region and a non-display region disposed around the display region. The display region includes a peripheral display region adjacent to the non-display region. The peripheral display region includes a black matrix and a plurality of sub-pixels defined by the black matrix, and the plurality of sub-pixels include a plurality of first sub-pixels, a plurality of second sub-pixels and a plurality of third sub-pixels.

A sum of the ratios of the light-transmitting areas respectively corresponding to the plurality of the first sub-pixels to areas of the plurality of the first sub-pixel is represented as P1, a sum of the ratios of the light-transmitting areas respectively corresponding to the plurality of the second sub-pixels to areas of the plurality of the second sub-pixel is represented as P2, and a sum of the ratios of the light-transmitting area respectively corresponding to the plurality of the third sub-pixels to areas of the plurality of the third sub-pixel is represented as P3, then a difference between the maximum value and the minimum value among P1, P2 and P3 is less than 0.3 times of an average value of P1, P2 and P3, where, P1, P2 and P3 are greater than zero.

In a second example, embodiments of the disclosure further provide a display device, which includes the color filter substrate provided in any one of the embodiments of the disclosure.

The peripheral display region of the color filter substrate in embodiments of the disclosure include a plurality of first sub-pixels, a plurality of second sub-pixels and a plurality of third sub-pixels defined by the black matrix. That is, the peripheral display region is provided with the sub-pixel, avoiding huge steps existing in the color filter substrate, enhancing the continuity of the displayed information. In addition, a difference between the maximum value and the minimum value among P1, P2 and P3 is less than 0.3 times the average value of P1, P2 and P3, such that the ratios of different types of sub-pixels covered in the peripheral display region are approximately identical. That is, the light-transmitting ratios of different types of sub-pixels are approximately identical, avoiding the color cast existing in the color filter substrate, and enhancing visual effects of the display device.

While multiple embodiments are disclosed, still other embodiments of the disclosure will become apparent to those skilled in the art from the following detailed description, which shows and describes illustrative embodiments of the disclosure. Accordingly, the drawings and detailed description are to be regarded as illustrative in nature and not restrictive.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

The disclosure will be further described below in detail in conjunction with embodiments and the accompanying drawings. It should be appreciated that specific embodiments described herein are merely for explaining the disclosure but are not intended to limit the disclosure. It should also be noted that only parts of but not all content of the disclosure are shown in the accompany drawings for the sake of description. Moreover, the dimension and size of structures shown in the accompany drawings are not necessarily actual or proportional to actual structure sizes.

Figure 2A:
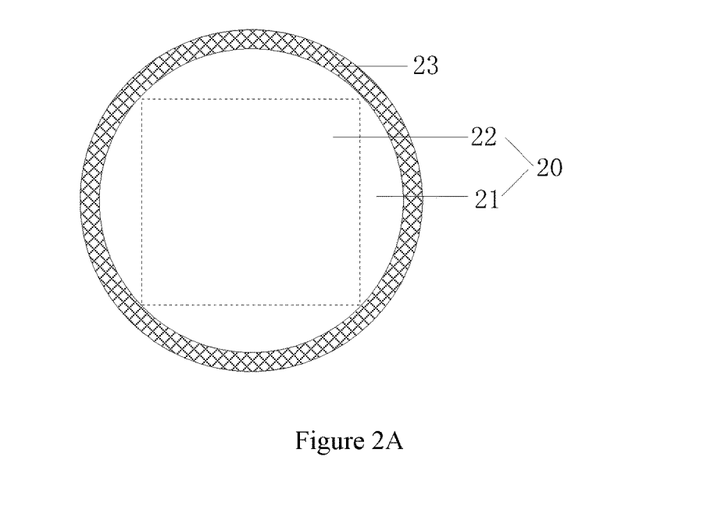
FIG. 2A is a schematic top view of a color filter substrate, according to embodiments of the disclosure.
Figure 2B:
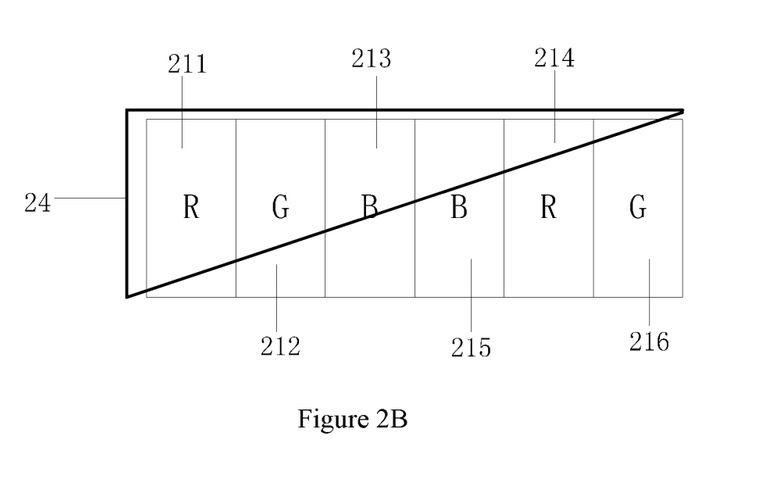
FIG. 2B is a schematic top view of a peripheral display region of the color filter substrate, according to embodiments of the disclosure.

FIG. 2A is a schematic top view of a color filter substrate, according to embodiments of the disclosure, and FIG. 2B is a schematic top view of a peripheral display region of the color filter substrate, according to embodiments of the disclosure. Embodiments of the disclosure will be described in conjunction with FIG. 2A and FIG. 2B. As shown in FIG. 2A, the color filter substrate includes a non-rectangular display region 20 and a non-display region 23 disposed around the display region 20. The display region 20 includes a peripheral display region 21 adjacent to the non-display region 23. A peripheral shape of the display region 20 may be in a non-rectangular shape such as a parallelogram, a trapezoid, an oval or a circularity, or it may be a rectangle having a non-straight edge, for example, a rectangle having a non-straight edge in a wave, jaggies, or zigzag line shape. The rectangle having a non-straight edge is still not a strictly defined rectangle, and a circular peripheral display region is taken as an example in embodiments to illustrate the peripheral display region.

The display region 20 further includes a central display region 22 away from the non-display region 23, and the central display region 22 may include a plurality of first sub-pixels (not shown), a plurality of second sub-pixels (not shown) and a plurality of third sub-pixels (not shown), where the number of the first sub-pixels, the number of the second sub-pixels and the number of the third sub-pixels are equal to each other. For example, the central display region 22 may include a plurality of pixel units, and each pixel unit includes the first sub-pixel, the second sub-pixel and the third sub-pixel sequentially arranged in a first preset direction such as a direction from left to right or from right to left. The different types of sub-pixels (i.e. the first sub-pixels, the second sub-pixels, and the third sub-pixels) in the central display region 22 are equal in number, and all these sub-pixels are not covered in the central display region 22, that is, the different types of sub-pixels are equal in light-transmitting area, therefore there is no color cast phenomenon in the central display region 22.

The peripheral display region 21 includes a black matrix (BM) 24 and a plurality of sub-pixels defined by the black matrix 24, and sub-pixels in the peripheral display region 21 are partially covered by the black matrix 24. The plurality of sub-pixels may include a plurality of first sub-pixels, a plurality of second sub-pixels and a plurality of third sub-pixels. If a sum of ratios of light-transmitting areas respectively corresponding to the plurality of the first sub-pixels to areas of the respective first sub-pixels is represented as P1, a sum of ratios of light-transmitting areas respectively corresponding to the plurality of the second sub-pixels to areas of the respective second sub-pixels is represented as P2, and a sum of ratios of light-transmitting areas respectively corresponding to the plurality of the third sub-pixels to areas of the respective third sub-pixels is represented as P3, a difference between the maximum value and the minimum value among the sums P1, P2 and P3 is less than 0.3 times of an average value of the sums P1, P2 and P3, where P1, P2 and P3 are greater than zero.

Optionally, the first sub-pixel, the second sub-pixel and the third sub-pixel are selected from a group consisting of red, green and blue sub-pixels. For example, the first sub-pixel may be a red sub-pixel R, the second sub-pixel may be a green sub-pixel G and the third sub-pixel may be a blue sub-pixel B.

It should be noted that the first sub-pixel, the second sub-pixel and the third sub-pixel are not limited in the disclosure. For example, the first sub-pixel may also be the green sub-pixel G, the second sub-pixel may also be the red sub-pixel R, and the third sub-pixel may also be the blue sub-pixel B.

FIG. 2B shows a micron-scale enlarged view of a boundary of the circular peripheral display region, where a segment of the circular boundary may be equivalent to a segment of a straight boundary. The peripheral display region may include a first sub-pixel 211, a second sub-pixel 212, a third sub-pixel 213, a fourth sub-pixel 214, a fifth sub-pixel 215 and a sixth sub-pixel 216. A red color filter R, a green color filter G, a blue color filter B, a blue color filter B, a red color filter R and a green color filter G are respectively arranged from left to right at the first to sixth sub-pixels, which are covered by the black matrix 24. In addition, a ratio of a light-transmitting area corresponding to each sub-pixel to an area of the sub-pixel may be preset, for example, ratios of light-transmitting areas respectively corresponding to the first to sixth sub-pixels to areas of the respective first to sixth sub-pixels from left to right are preset as 0.1, 0.2, 0.3, 0.4, 0.5 and 0.6, respectively. Therefore, P1, P2 and P3 are respectively 0.6, 0.8, and 0.7 in the peripheral display region, a difference between the maximum value 0.8 and the minimum value 0.6 among P1, P2 and P'is 0.2, and an average value of P1, P2 and P3 is 0.7, thus, the difference is 0.286 times of the average value.

As such, the difference between the maximum value and the minimum value among P1, P2 and P3 is less than 0.3 times of the average value of P1, P2 and P3 in the peripheral display region 21, that is, ratios of different types of covered sub-pixels are approximately identical, so that there is no color cast phenomenon in the peripheral display region 21, thus improving quality of the color filter substrate, and enhancing visual effects of the display device.

It should be noted that, positions of the sub-pixels are not limited in embodiments of the disclosure, and the ratio of the light-transmitting area corresponding to a sub-pixel to an area of the sub-pixel is not limited in embodiments of the disclosure either.

Embodiments of the disclosure provide a color filter substrate, where the peripheral display region includes a black matrix and a plurality of first sub-pixels, a plurality of second sub-pixels and a plurality of third sub-pixels defined by the black matrix. Moreover, differences between a sum of ratios of light-transmitting areas respectively corresponding to the first sub-pixels to areas of the first sub-pixels, a sum of ratios of light-transmitting areas respectively corresponding to the second sub-pixels to areas of the second sub-pixels, and a sum of ratios of light-transmitting areas respectively corresponding to the third sub-pixels to areas of the third sub-pixels are insignificant, thus there is no jaggies phenomenon in the peripheral display region of the color filter substrate; further, the above-described sums of various types of sub-pixels are close to each other, thus preventing color cast phenomenon in the display device, and enhancing visual effects of the display device.

Figure 3:
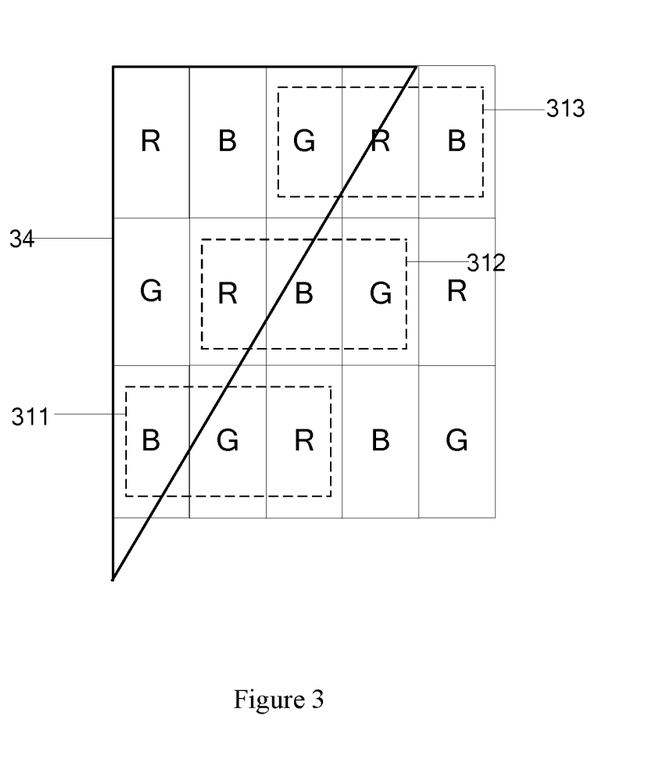
FIG. 3 is a schematic top view of a peripheral display region of a color filter substrate, according to embodiments of the disclosure.

FIG. 3 is a schematic top view of a peripheral display region, according to embodiments of the disclosure. Based on the embodiments of the disclosure above, the peripheral display region is defined in embodiments of the disclosure as follows: in the peripheral display region, ratios of light-transmitting areas respectively corresponding to sub-pixels to areas of the sub-pixels constitute an arithmetic sequence along a row direction in a pixel unit at each row, and tolerances of the arithmetic sequences are the same. Further, a direction from left to right is referred to as a reference direction in the embodiments.

It should be noted that the peripheral display regions provided in embodiments of the disclosure may correspond to different peripheral shapes of display regions, which applies to other embodiments of the disclosure.

As shown in FIG. 3, the peripheral display region includes a pixel unit 311 at the first row, a pixel unit 312 at the second row, and a pixel unit 313 at the third row. A third sub-pixel B, a second sub-pixel G, and a first sub-pixel R in the pixel unit 311 at the first row are sequentially arranged along the reference direction; a first sub-pixel R, a third sub-pixel B and a second sub-pixel G in the pixel unit 312 at the second row are sequentially arranged along the reference direction; and a second sub-pixel G, a first sub-pixel R and a third sub-pixel B in the pixel unit 313 at the third row are sequentially arranged along the reference direction. The peripheral display region is partially covered by a black matrix 34.

In the pixel unit 311 at the first row, ratios of light-transmitting areas respectively corresponding to the third sub-pixel B, the second sub-pixel G, and the first sub-pixel R to areas of these sub-pixels B, G and R are a1, a1+d and a1+2d, respectively. In the pixel unit 312 at the second row, ratios of light-transmitting areas respectively corresponding to the first sub-pixel R, the third sub-pixel B and the second sub-pixel G to areas of these sub-pixels R, B and G are a2, a2+d and a2+2d, respectively. In the pixel unit 313 at the third row, ratios of light-transmitting areas respectively corresponding to the second sub-pixel G, the first sub-pixel R and the third sub-pixel B to areas of these sub-pixel G, R and B are a3, a3+d and a3+2d, respectively. Therefore, P1, P2 and P3 in the peripheral display region are each equal to a1+a2+a3+3d. For example, when a1 is equal to 0.1, a2 is equal to 0.4, a3 is equal to 0.7 and d is equal to 0.1, P1, P2 and 3 are each equal to 1.5.

As such, sums of ratios of light-transmitting areas respectively corresponding to various types of sub-pixels in the peripheral display region to areas of the sub-pixels are the same, that is, light-transmitting ratios of the various types of sub-pixels in the peripheral display region are the same, therefore there is no color cast phenomena in the peripheral display region.

Alternatively, in the peripheral display region, ratios of light-transmitting areas respectively corresponding to sub-pixels to areas of the sub-pixels constitute an arithmetic sequence in a pixel unit at each column, and tolerances of the arithmetic sequences are the same.

In the peripheral display region, according to embodiments of the disclosure, ratios of light-transmitting areas respectively corresponding to sub-pixels in a pixel unit at each various row to areas of the sub-pixels constitute an arithmetic sequence, and tolerances of the arithmetic sequences are the same, so that light-transmitting ratios of various types of sub-pixels in the peripheral display region are approximately the same, thus enhancing visual effects of the display device.

Figure 4A:
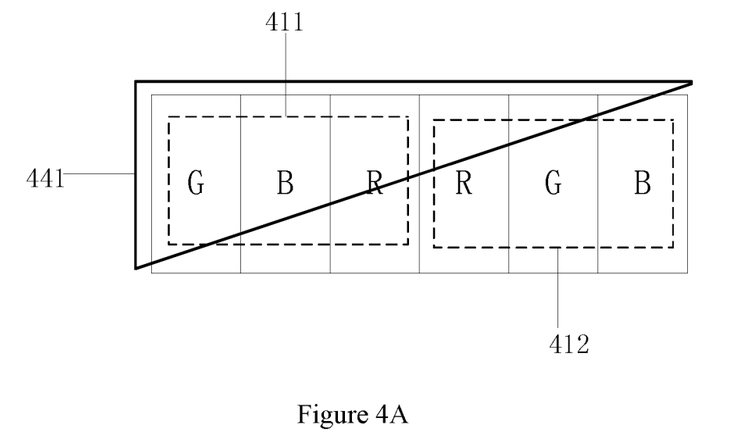
FIG. 4A is a schematic top view of a peripheral display region of a color filter substrate, according to embodiments of the disclosure.

FIG. 4A is a schematic top view of a peripheral display region of a color filter substrate, according to embodiments of the disclosure. Based on the above-described embodiments, the peripheral display region is defined in embodiments of the disclosure as follows: the peripheral display region includes a plurality of pixel units, and each of the pixel units includes one first sub-pixel, one second sub-pixel and one third sub-pixel, which are arranged in order according to a preset rule. The peripheral display region is described in embodiments by taking an example that the first sub-pixel is a red sub-pixel R, the second sub-pixel is a green sub-pixel G, and the third sub-pixel is a blue sub-pixel B. Further, a direction from left to right is referred to as a reference direction in the embodiments.

As shown in FIG. 4A, the peripheral display region includes two adjacent pixel units, where a second sub-pixel G, a third sub-pixel B and a first sub-pixel R in one of the two pixel units are sequentially arranged along the reference direction, a first sub-pixel R, a second sub-pixel G and a third sub-pixel B in the other one of the two pixel units are sequentially arranged along the reference direction, and each of these sub-pixels is partially covered by a black matrix 441. For example, when ratios of light-transmitting areas respectively corresponding to the second sub-pixel G, the third sub-pixel B and the first sub-pixel R in the pixel unit 411 to areas of these sub-pixels G, B and R are 0.1, 0.2 and 0.3 respectively along the reference direction, and ratios of light-transmitting areas respectively corresponding to the first sub-pixel R, the second sub-pixel G and the third sub-pixel B in the pixel unit 412 to areas of these sub-pixels R, G and B are 0.4, 0.5 and 0.6 respectively along the reference direction, P1, P2 and P3 are 0.7, 0.6 and 0.8 respectively in the peripheral display region. Thus, a difference between the maximum value 0.8 and the minimum value 0.6 among P1, P2, and P3 is 0.2, an average value of P1, P2 and P3 is 0.7, and the difference is 0.286 times of the average value, that is, differences between light-transmitting ratios of various types of sub-pixels in the peripheral display region are insignificant, therefore color cast caused by different light-transmitting ratios of various types of sub-pixels cannot be distinguished with naked eyes, namely, visual effects of the color filter substrate including the peripheral display region are enhanced.

The peripheral display region includes first pixel units and second pixel units adjacent to the first pixel units, and the number of the first pixel units is equal to that of the second pixel units. The first pixel unit includes a first sub-pixel, a second sub-pixel and a third sub-pixel arranged in sequence in a preset first direction, and the second pixel unit includes a third sub-pixel, a second sub-pixel and a first sub-pixel arranged in sequence in the preset first direction.

Figure 4B:
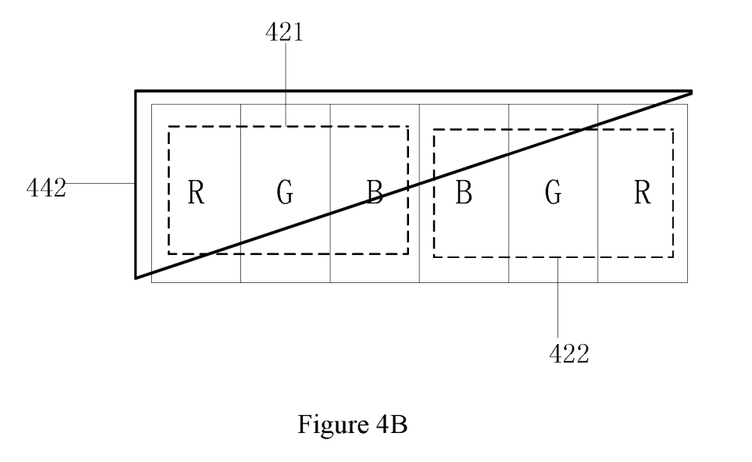
FIG. 4B is a schematic top view of another peripheral display region of a color filter substrate, according to embodiments of the disclosure.

FIG. 4B is a schematic top view of another peripheral display region of a color filter substrate, according to embodiments of the disclosure. As shown in FIG. 4B, the peripheral display region includes adjacent first pixel unit 421 and second pixel unit 422 in the same row. Here, there are one first pixel unit 421 and one second pixel unit 422. A first sub-pixel R, a second sub-pixel G and a third sub-pixel B in the first pixel unit 421 are sequentially arranged along the reference direction, a third sub-pixel B, a second sub-pixel G and a first sub-pixel R in the second pixel unit 422 are sequentially arranged along the reference direction, and the peripheral display region is partially covered by a black matrix 442. For example, when ratios of light-transmitting areas respectively corresponding to the sub-pixels in the first and second pixel units 421 and 422 to areas of these sub-pixels are respectively 0.1, 0.2, 0.3, 0.4, 0.5 and 0.6 along the reference direction, a sum of ratios of light-transmitting areas corresponding to each type of sub-pixels in the peripheral display region to areas of the sub-pixels are 0.7, that is, light-transmitting ratios of various types of sub-pixels in the peripheral display region shown in FIG. 4B are the same, thus enhancing visual effects of the color filter substrate containing the peripheral display region.

Figure 4C:
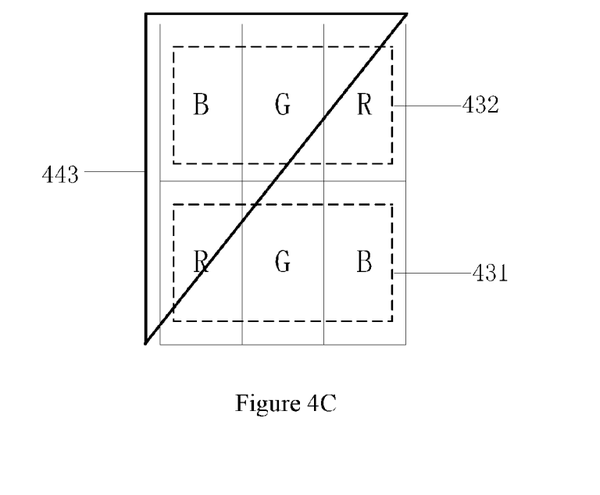
FIG. 4C is a schematic top view of yet another peripheral display region of a color filter substrate, according to embodiments of the disclosure.

FIG. 4C is a schematic top view of yet another peripheral display region of a color filter substrate, according to embodiments of the disclosure. As shown in FIG. 4C, the peripheral display region includes a first pixel unit 431 arranged in the first row and a second pixel unit 432 arranged in the second row. Here, there are one first pixel unit 431 and one second pixel unit 432. A first sub-pixel R, a second sub-pixel G and a third sub-pixel B in the first pixel unit 431 are sequentially arranged along the reference direction, a third sub-pixel B, a second sub-pixel G and a first sub-pixel R in the second pixel unit 432 are sequentially arranged along the reference direction, and the peripheral display region is partially covered by a black matrix 443. For example, light-transmitting ratios of various types of sub-pixels in the peripheral display region shown in FIG. 4C are the same, thus enhancing visual effects of the color filter substrate containing the peripheral display region.

The peripheral display region provided in embodiments of the disclosure include adjacent first pixel units and second pixel units adjacent to the first pixel units. When the number of the first pixel units is equal to that of the second pixel units, light-transmitting ratios of various types of sub-pixels in the peripheral display region are approximately same, thus alleviating color cast phenomenon of various types of sub-pixels in the peripheral display region, and enhancing visual effects of the color filter substrate containing the peripheral display region.

Figure 5A:
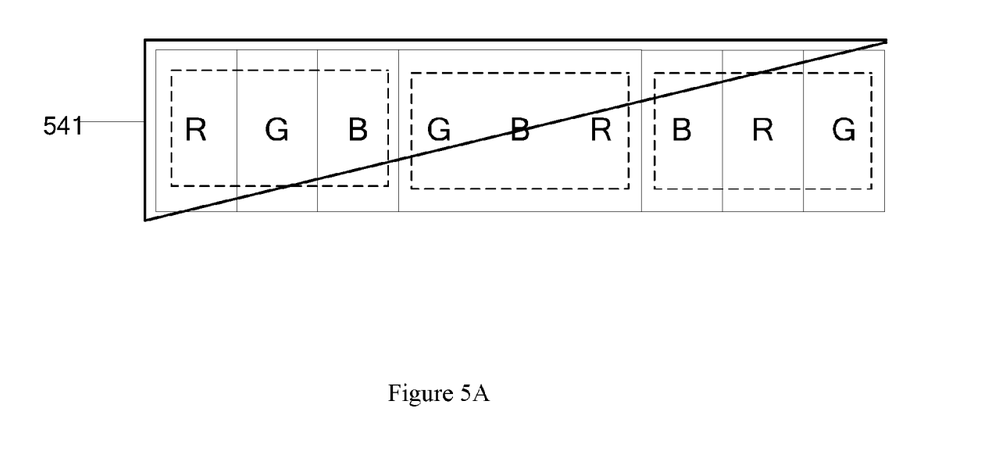
FIG. 5A is a schematic top view of a peripheral display region of a color filter substrate, according to embodiments of the disclosure.
Figure 5B:
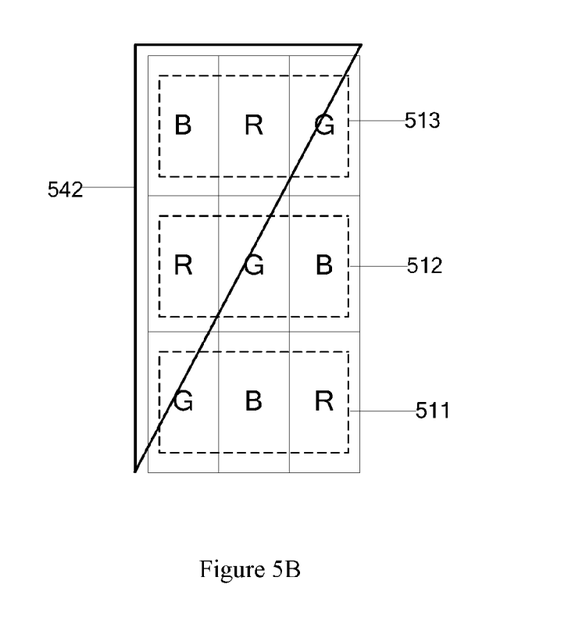
FIG. 5B is a schematic top view of another peripheral display region of a color filter substrate, according to embodiments of the disclosure.

FIGS. 5A and 5B are schematic top views of a peripheral display region of a color filter substrate, according to embodiments of the disclosure. Based on the above-described embodiments, the peripheral display region is defined in embodiments of the disclosure as follows: the peripheral display region includes a first pixel array including a first pixel unit, a third pixel unit and a fourth pixel unit, and the number of the first pixel units, the number of the third pixel units and the number of the fourth pixel units are the same. The first pixel unit includes a first sub-pixel, a second sub-pixel and a third sub-pixel disposed sequentially in a preset first direction, the third pixel unit includes a second sub-pixel, a third sub-pixel and a first sub-pixel disposed sequentially in the preset first direction, and the fourth pixel unit includes a third sub-pixel, a first sub-pixel and a second sub-pixel disposed sequentially in the preset first direction. The peripheral display region in embodiments is described by taking an example that the first sub-pixel is a red sub-pixel R, the second sub-pixel is a green sub-pixel G, and the third sub-pixel is a blue sub-pixel B. Further, a direction from left to right is referred to as a reference direction in the present embodiment.

As shown in FIG. 5A, the peripheral display region is composed of the first pixel array, where the first pixel unit, the third pixel unit and the fourth pixel unit in the first pixel array are sequentially arranged along the reference direction. The first sub-pixel R, the second sub-pixel G and the third sub-pixel B in the first pixel unit are sequentially arranged along the reference direction, the second sub-pixel G, the third sub-pixel B and the first sub-pixel R in the third pixel unit are sequentially arranged along the reference direction, the third sub-pixel B, the first sub-pixel R and the second sub-pixel G in the fourth pixel unit are sequentially arranged along the reference direction, and the peripheral display region is partially covered by a black matrix 541. For example, ratios of light-transmitting areas respectively corresponding to the sub-pixels in the first pixel array to areas of the sub-pixels are 0.1, 0.2, 0.3, 0.4, 0.5, 0.6, 0.7, 0.8 and 0.9 in sequence along the reference direction, and a sum of ratios of light-transmitting areas respectively corresponding to each type of the sub-pixels in the peripheral display region to areas of the sub-pixels is 1.5. As shown in FIG. 5B, the peripheral display region is composed of a second pixel array including a third pixel unit GBR arranged in a first row 511, a first pixel unit RGB arranged in a second row 512, and a fourth pixel unit BRG arranged in a third row 513, and the peripheral display region is partially covered by a black matrix 542. For example, light-transmitting ratios of various types of sub-pixels in the peripheral display region composed of the second pixel array are the same.

Figure 5C:
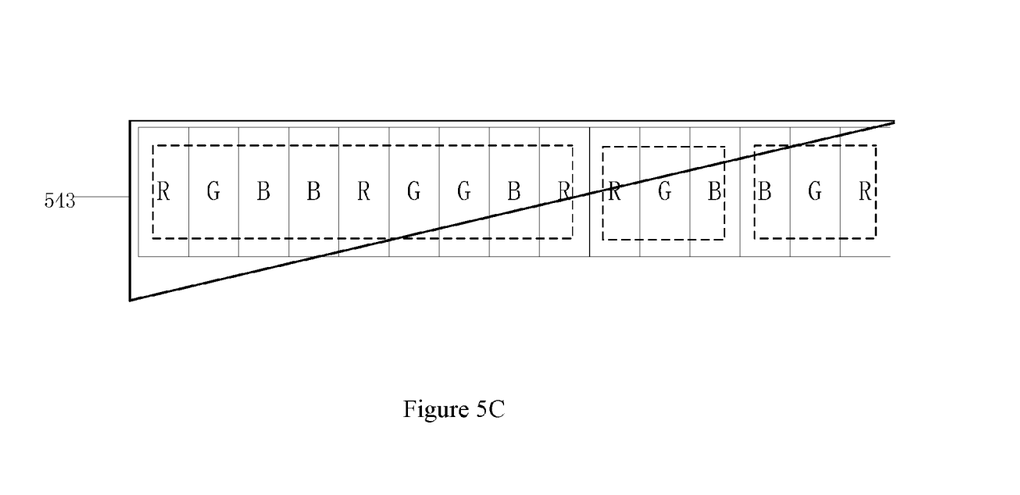
FIG. 5C is a schematic top view of yet another peripheral display region of a color filter substrate, according to embodiments of the disclosure.

FIG. 5C is a schematic top view of yet another peripheral display region, according to embodiments of the disclosure. As shown in FIG. 5C, a first pixel array RGBBRGGBR, a first pixel unit RGB and a second pixel unit BGR in the peripheral display region are sequentially arranged along the reference direction, and the peripheral display region is partially covered by a black matrix 543. Light-transmitting ratios of various types of sub-pixels in the peripheral display region are the same, since a sum of ratios of light-transmitting areas respectively corresponding to each type of sub-pixels in the first pixel array to areas of the type of sub-pixels is equal to a sum of ratios of light-transmitting areas respectively corresponding to any other type of sub-pixels in the first pixel array to areas of the other type of sub-pixels, and a sum of ratios of light-transmitting areas respectively corresponding to each type of sub-pixels in the adjacently arranged first pixel unit RGB and second pixel unit BGR to areas of the type of sub-pixels is equal to a sum of ratios of light-transmitting areas respectively corresponding to any other type of sub-pixels in the adjacently arranged first pixel unit RGB and second pixel unit BGR to areas of the other type of sub-pixels.

Figure 5D:
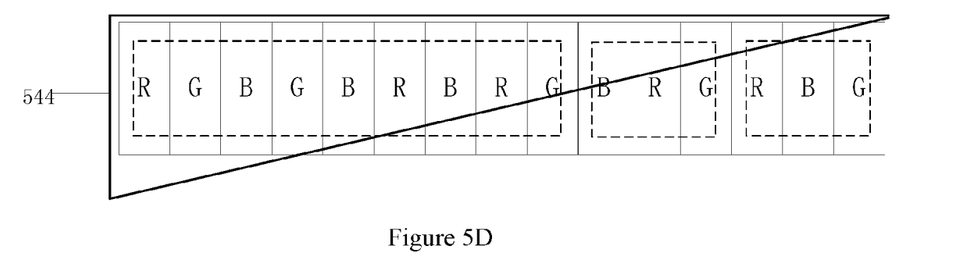
FIG. 5D is a schematic top view of yet another peripheral display region of a color filter substrate, according to embodiments of the disclosure.

FIG. 5D is a schematic top view of yet another peripheral display region according to the forth embodiment of the present disclosure. As shown in FIG. 5D, the first pixel array RGBBRGGBR, a fourth pixel unit BRG and a fifth pixel unit RBG in the peripheral display region are sequentially arranged along the reference direction, where a first sub-pixel R, a third sub-pixel B, and a second sub-pixel G in the fifth pixel unit RBG are sequentially arranged along the reference direction, and the peripheral display region is partially covered by a black matrix 544. For example, when ratios of light-transmitting areas respectively corresponding to the sub-pixels in the peripheral display region to areas of the sub-pixels are 0.1, 0.15, 0.2, 0.25, 0.3, 0.35, 0.4, 0.45, 0.5, 0.55, 0.6, 0.65, 0.7, 0.75 and 0.8 in sequence along the reference direction, likewise P1 is equal to 2.2, P2 is equal to 2.35 and P3 is equal to 2.2 in the peripheral display region, then a difference between the maximum value and the minimum value among P1, P2 and P3 is 0.067 times of an average value of P1, P2 and P3. Therefore, light-transmitting ratios of various types of sub-pixels included in the peripheral display region shown in FIG. 5D are approximately same.

Figure 5E:
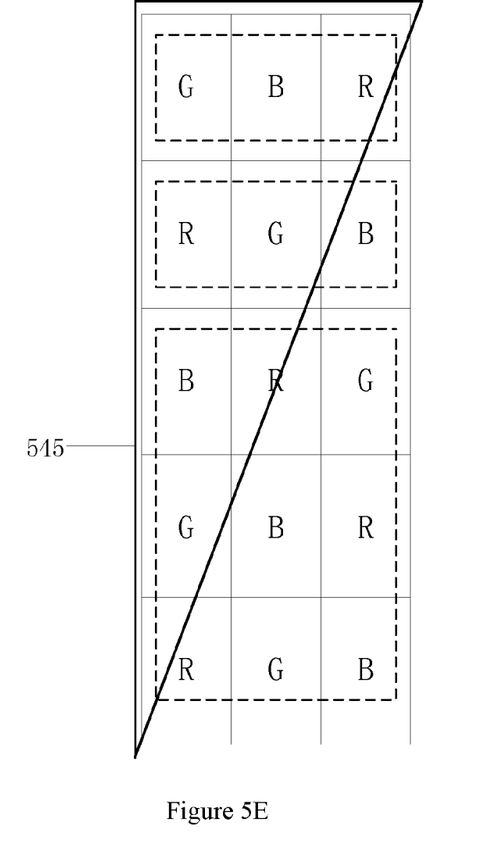
FIG. 5E is a schematic top view of still another peripheral display region of a color filter substrate, according to embodiments of the disclosure.
Figure 5F:
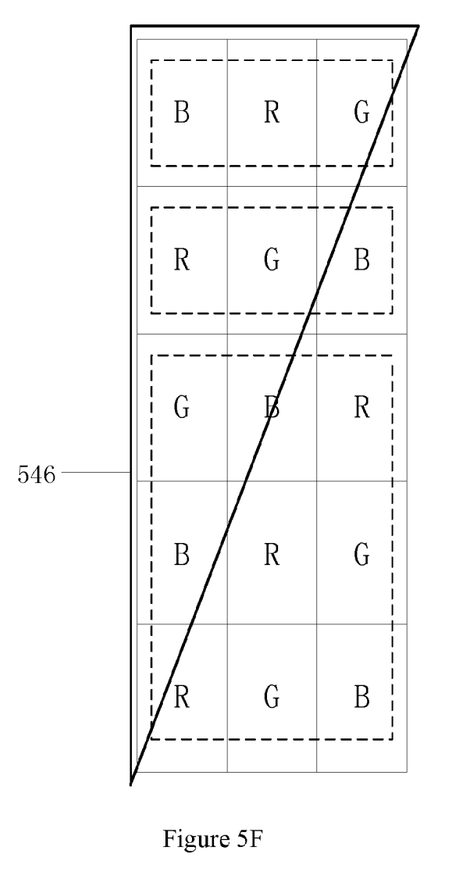
FIG. 5F is a schematic top view of further another peripheral display region of a color filter substrate, according to embodiments of the disclosure.

FIGS. 5E and 5F are schematic top views of peripheral display regions, according to embodiments of the disclosure. As shown in FIG. 5E, a peripheral display region includes a first pixel array, a first pixel unit RGB and a third pixel unit GBR, and the peripheral display region is partially covered by a black matrix 545. As shown in FIG. 5F, a peripheral display region includes a first pixel array, a first pixel unit RGB and a fourth pixel unit BRG, and the peripheral display region is partially covered by a black matrix 546. The difference between the maximum value and the minimum value among P1, P2 and P3 in the peripheral display region shown in any of FIGS. 5E and 5F is 0.05 times of an average value of P1, P2 and P3, that is, light-transmitting ratios of various types of sub-pixels in the peripheral display region are approximately the same.

In various peripheral display regions shown in embodiments of the disclosure, differences of light-transmitting ratios of various types of sub-pixels are small, thus improving quality of the color filter substrate containing various peripheral display regions, and enhancing visual effects of the display device.

Based on the above-described embodiments, the embodiments provide a new peripheral display region. The peripheral display region includes a fourth sub-pixel, and a sum of ratios of ight-transmitting areas respectively corresponding to a plurality of the fourth sub-pixels to areas of the fourth sub-pixels is represented as P4, then a difference between the maximum value and the minimum value among P1, P2, P3 and P4 is less than 0.3 times of an average value of P1, P2, P3 and P4, where P1, P2, P3 and P4 are greater than zero. Optionally, the peripheral display region includes four types of sub-pixels including red sub-pixel, green sub-pixel, blue sub-pixel and white sub-pixel. The peripheral display region in embodiments is described in detail by taking an example that the first sub-pixel is a red sub-pixel R, the second sub-pixel is a green sub-pixel G, the third sub-pixel is a blue sub-pixel B, and the fourth sub-pixel is a white sub-pixel W. Further, a direction from left to right is referred to as a reference direction in the embodiments.

Figure 6:
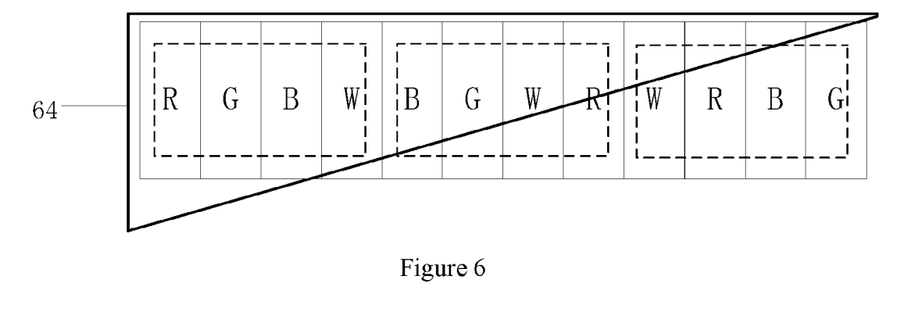
FIG. 6 is a sectional view of a peripheral display region of a color filter substrate, according to embodiments of the disclosure.

FIG. 6 is a sectional view of a peripheral display region, according to embodiments of the disclosure. As shown in FIG. 6, a first sub-pixel R, a second sub-pixel G, a third sub-pixel B, a fourth sub-pixel W, a third sub-pixel B, a second sub-pixel G, a fourth sub-pixel W, a first sub-pixel R, a fourth sub-pixel W, a first sub-pixel R, a third sub-pixel B and a second sub-pixel G are sequentially arranged along the reference direction in the peripheral display region, and the peripheral display region is partially covered by a black matrix 64. When ratios of light-transmitting areas respectively corresponding to the sub-pixels in the peripheral display region to areas of these sub-pixels are 0.1, 0.15, 0.2, 0.25, 0.3, 0.35, 0.4, 0.45, 0.5, 0.55, 0.6 and 0.65 in sequence along the reference direction, a sum P1 of ratios of light-transmitting areas respectively corresponding to all the first sub-pixels R in the peripheral display region to areas of the first sub-pixels R is 1.1, a sum P2 of ratios of light-transmitting areas respectively corresponding to all the second sub-pixels G in the peripheral display region to areas of the second sub-pixels G is 1.1, a sum P3 of ratios of light-transmitting areas respectively corresponding to all the third sub-pixels B to areas of the third sub-pixels in the peripheral display region is 1.15, and a sum P4 of ratios of light-transmitting areas respectively corresponding to all the fourth sub-pixels W to areas of the fourth sub-pixels in the peripheral display region is 1.15. Therefore, a difference between the maximum value and the minimum value among P1, P2, P3 and P4 is 0.04 times of an average value of P1, P2, P3 and P4, that is, the difference between the maximum value and the minimum value among P1, P2, P3 and P4 is less than 0.3 times of the average value of P1, P2, P3 and P4. Accordingly, light-transmitting ratios of various types of sub-pixels in the peripheral display region shown in FIG. 6 are approximately the same.

The above sum of ratios of light-transmitting areas respectively corresponding to each type of sub-pixels to areas of the type of sub-pixels is the same as the sum of ratios of light-transmitting areas respectively corresponding to any other type of sub-pixels to areas of the other type of sub-pixels.

In the peripheral display region provided by embodiments of the disclosure, differences between the light-transmitting ratios of various types of sub-pixels are insignificant, thus improving quality of the color filter substrate, and enhancing visual effects of the display device.

Embodiments of the disclosure provide a display device including a color filter substrate according to any one of the above embodiments in the disclosure.

Figure 7A:
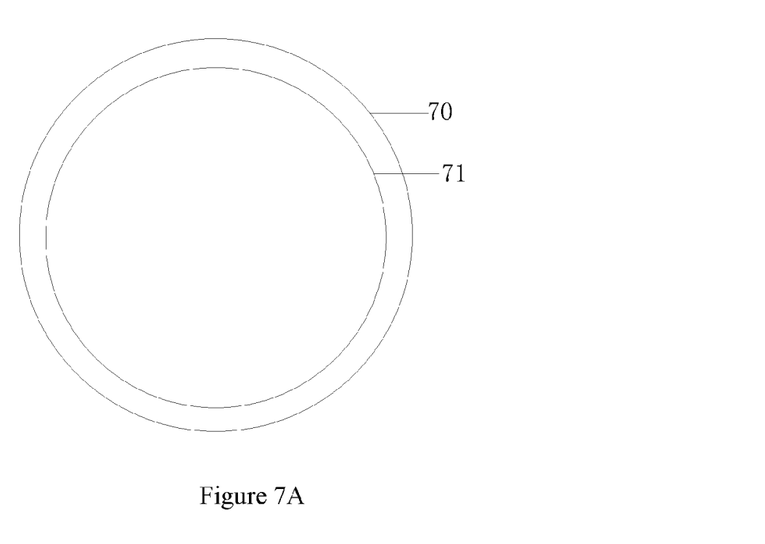
FIG. 7A is a schematic diagram showing a structure of a display device, according to embodiments of the disclosure.

FIG. 7A is a schematic diagram showing a structure of a display device according to embodiments of the disclosure. Referring to FIG. 7A, a display device 70 includes a display panel 71, and may further include a drive circuit and other parts for proper operations of the display device 70. The display panel 71 includes a color filter substrate according to any one of the above-described embodiments in the disclosure, an array substrate disposed opposite to the color filter substrate, and a liquid crystal layer filled between the array substrate and the color filter substrate. A principle of displaying by the liquid crystal layer lies in that: when a voltage is applied across the array substrate and the color filter substrate and hence an electric field is formed between these two substrates, so that liquid crystal molecules are rotated under an effect of the electric field to control the passage of light beams, thereby achieving image displaying.

Figure 7B:
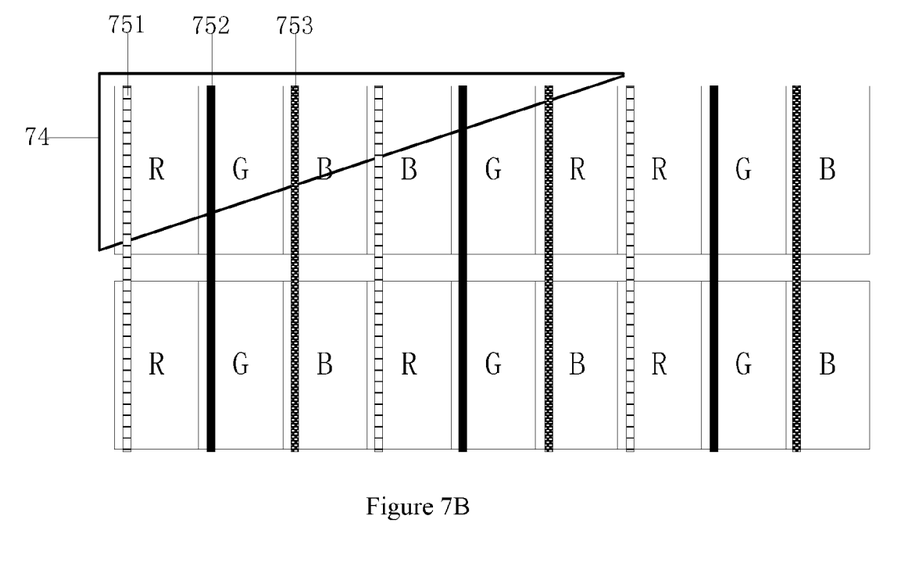
FIG. 7B is a schematic top view of a liquid crystal display panel, according to embodiments of the disclosure.

FIG. 7B is a schematic top view of a liquid crystal display panel of the color filter substrate, according to embodiments of the disclosure. As shown in FIG. 7B, a peripheral display region is partially covered by a black matrix 74. Each sub-pixel in the peripheral display region is connected to a corresponding data line. For example, all sub-pixels in a first column are connected to a first data line 751, all sub-pixels in a second column are connected to a second data line 752, all sub-pixels in a third column are connected to a third data line 753, and the like. In addition, signals to certain sub-pixels in the peripheral display region are accordingly processed, such that the partially covered sub-pixels display a consistent grayscale, thus avoiding not only a color cast phenomenon but also a jaggies phenomenon, and enhancing visual effects of the display device.

In the display device provided by embodiments of the disclosure, light-transmitting ratios of various types of sub-pixels are approximately the same, therefore neither a jaggies phenomenon nor a color cast phenomenon exists in an image displayed by the display device, thus enhancing visual effects of the display device.

In addition, it should be noted that although above-described embodiments are only described by taking a circular display device as an example, the color filter substrate provided by the disclosure is also applied to other non-rectangular display devices.

It should be noted that the above-described are embodiments of the disclosure and the technology and the principles thereof. Those skilled in the art will appreciate that the disclosure is not limited to the specific embodiments described herein. Also, obvious changes, readjustments and substitutions can be made without departing from the scope of the disclosure. Therefore, although the above embodiments of the disclosure have been described in detail, the disclosure is not limited to the above embodiments. The disclosure may further include other embodiments without departing from the scope of the disclosure.

Various modifications and additions can be made to the exemplary embodiments discussed without departing from the scope of the disclosure. For example, while the embodiments described above refer to particular features, the scope of this disclosure also includes embodiments having different combinations of features and embodiments that do not include all of the described features. Accordingly, the scope of the disclosure is intended to embrace all such alternatives, modifications, and variations as fall within the scope of the claims, together with all equivalents thereof.

We claim:

1. A color filter substrate, comprising a non-rectangular display region and a non-display region disposed around the display region, wherein the display region comprises a peripheral display region adjacent to the non-display region, the peripheral display region comprises a black matrix and a plurality of sub-pixels defined by the black matrix, each of the plurality of sub-pixels in the peripheral display region is partially covered by the black matrix, which can block the light, and the plurality of sub-pixels comprise a plurality of first sub-pixels, a plurality of second sub-pixels and a plurality of third sub-pixels, wherein,
each of the plurality of sub-pixels has a ratio of a light-transmitting area to a sub-pixel area, a sum of ratios of the plurality of first sub-pixels is represented as P1, a sum of ratios of the plurality of second sub-pixels is represented as P2, and a sum of ratios of the plurality of third sub-pixels is represented as P3, a difference between the maximum value and the minimum value among P1, P2 and P3 is less than 0.3 times an average value of P1, P2 and P3, wherein P1, P2, and P3 are greater than zero; and
wherein the peripheral display region comprises a plurality of pixel units, each pixel unit comprises one first sub-pixel, one second sub-pixel, and one third sub-pixel and in each pixel unit, the light-transmitting area of the first sub-pixel, the light-transmitting area of the second sub-pixel, and the light-transmitting area of the third sub-pixel are different in value.

2. The color filter substrate according to claim 1, wherein in the peripheral display region, ratios of the sub-pixels in the same row constitute an arithmetic sequence along a row direction, and tolerances of the arithmetic sequences at the same row are same.

3. The color filter substrate according to claim 1, wherein the peripheral display region comprises one first pixel unit and one second pixel unit arranged in sequence in the preset first direction.

4. The color filter substrate according to claim 1, wherein the peripheral display region comprises one first pixel unit disposed in a first row and one second pixel unit disposed in a second row.

5. The color filter substrate according to claim 1, wherein the peripheral display region further comprises a first pixel array comprising at least one first pixel unit, at least one third pixel unit and at least one fourth pixel unit, and the number of the first pixel units, the number of the third pixel units, and the number of the fourth pixel units are equal, wherein,
each of the at least one first pixel unit comprises a first sub-pixel, a second sub-pixel and a third sub-pixel disposed sequentially in a preset first direction, each of the at least one third pixel unit comprises a second sub-pixel, a third sub-pixel and a first sub-pixel disposed sequentially in the preset first direction, and each of the at least one fourth pixel unit comprises a third sub-pixel, a first sub-pixel and a second sub-pixel disposed sequentially in the preset first direction.

6. The color filter substrate according to claim 5, wherein the peripheral display region comprises a first pixel array comprising a first pixel unit, a third pixel unit and a fourth pixel unit disposed sequentially in the preset first direction.

7. The color filter substrate according to claim 5, wherein the peripheral display region comprises a second pixel array comprising the third pixel unit disposed in the first row, the first pixel unit disposed in the second row and the fourth pixel unit disposed in the third row.

8. The color filter substrate according to claim 5, wherein the peripheral display region comprises the first pixel array, the first pixel unit and the second pixel unit disposed sequentially in the preset first direction.

9. The color filter substrate according to claim 5, wherein the peripheral display region comprises the first pixel array, the fourth pixel unit and a fifth pixel unit disposed sequentially in the preset first direction, wherein the fifth pixel unit comprises the first sub-pixel, the third sub-pixel and the second sub-pixel disposed sequentially in the preset first direction.

10. The color filter substrate according to claim 1, wherein each of the first sub-pixel, the second sub-pixel and the third sub-pixel is one of red, green and blue sub-pixels, and are different from each other.

11. The color filter substrate according to claim 1, wherein the peripheral display region further comprises a plurality of fourth sub-pixels, each of the plurality of fourth sub-pixels has a ratio of a light-transmitting area to a fourth sub-pixel area, and a sum of ratios of the plurality of fourth sub-pixels is represented as P4, then a difference between the maximum value and the minimum value among P1, P2, P3 and P4 is less than 0.3 times an average value of P1, P2, P3 and P4, wherein P1, P2, P3 and P4 are positive numbers greater than zero.

12. The color filter substrate according to claim 11, wherein each of the first sub-pixel, the second sub-pixel, the third sub-pixel and the fourth sub-pixel is one of red, green, blue and white sub-pixels, and are different from each other.

13. The color filter substrate according to claim 11, wherein sums of ratios of the plurality of first sub-pixels, sums of ratios of the plurality of second sub-pixels, sums of ratios of the plurality of third sub-pixels, and sums of ratios of the plurality of fourth sub-pixels are the same.

14. A display device, comprising a color filter substrate, comprising a non-rectangular display region and a non-display region disposed around the display region, wherein the display region comprises a peripheral display region adjacent to the non-display region, the peripheral display region comprises a black matrix and a plurality of sub-pixels defined by the black matrix, each of the plurality of sub-pixels in the peripheral display region is partially covered by the black matrix, which can block the light, and the plurality of sub-pixels comprise a plurality of first sub-pixels, a plurality of second sub-pixels and a plurality of third sub-pixels, wherein, each of the plurality of sub-pixels has a ratio of light-transmitting area to a sub-pixel area, a sum of ratios of the plurality of first sub-pixels is represented as P1, a sum of ratios of the plurality of second sub-pixels is represented as P2, and a sum of ratios of the plurality of third sub-pixels is represented as P3, a difference between the maximum value and the minimum value among P1, P2 and P3 is less than 0.3 times an average value of P1, P2 and P3, wherein P1, P2, and P3 are greater than zero; and wherein the peripheral display region comprises a plurality of pixel units, each pixel unit comprises one first sub-pixel, one second sub-pixel, and one third sub-pixel and in each pixel unit, the light-transmitting area of the first sub-pixel, the light-transmitting area of the second sub-pixel, and the light-transmitting area of the third sub-pixel are different in value.

* * * * *